No. 700,357. Patented May 20, 1902.
R. MORRIS.
YOKE AND DRAFT BAR FOR COUPLING.
(Application filed Feb. 10, 1902.)
(No Model.)
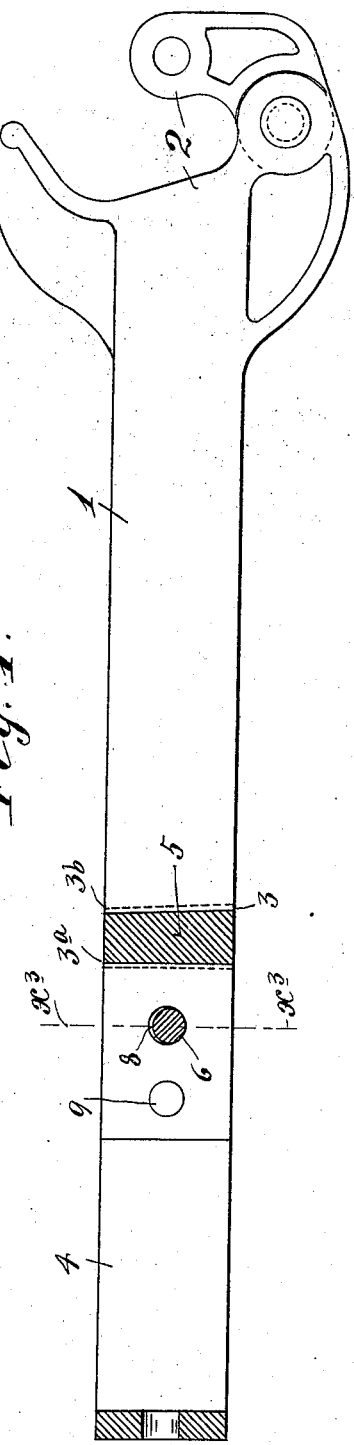
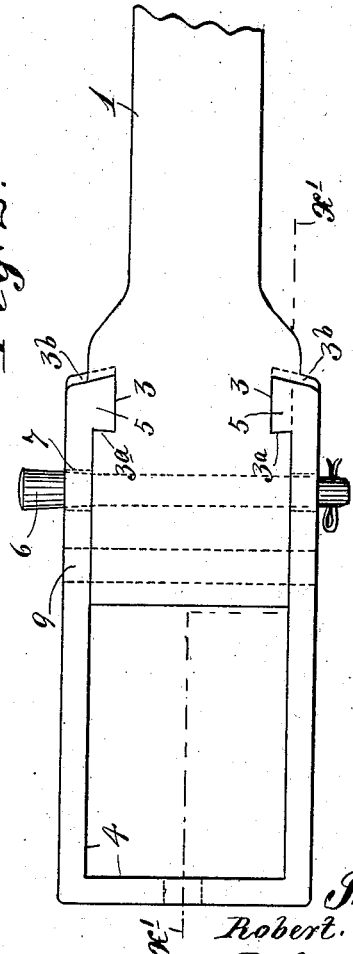
Witnesses.
A. H. Opsahl.
H. D. Kilgore.
Inventor,
Robert Morris.
By his Attorneys
Williamson + Merchant.

UNITED STATES PATENT OFFICE.

ROBERT MORRIS, OF LA CROSSE, WISCONSIN.

YOKE AND DRAFT-BAR FOR COUPLINGS.

SPECIFICATION forming part of Letters Patent No. 700,357, dated May 20, 1902.

Application filed February 10, 1902. Serial No. 93,285. (No model.)

*To all whom it may concern:*

Be it known that I, ROBERT MORRIS, a citizen of the United States, residing at La Crosse, in the county of La Crosse and State of Wisconsin, have invented certain new and useful Improvements in Yokes and Draft-Bars for Couplings; and I do hereby declare the following to be a full, clear, and exact description of the invention, such as will enable others skilled in the art to which it appertains to make and use the same.

My present invention relates to means for connecting to the draft-bar of a car-coupler that part of the draft-rigging generally known as the "stirrup" or "draft-yoke," and has for its object to improve the same in the several particulars hereinafter noted.

To the above ends the invention consists of the novel devices and combinations of devices hereinafter described, and defined in the claims.

My present invention is an improvement on the devices set forth and claimed in my two prior patents, No. 300,789, of June 24, 1884, and No. 400,474, of April 2, 1889, both entitled "Car-coupling."

My present invention goes much farther than either of my prior devices and provides a connection between the yoke and draft-bar which not only receives the draft strains, but prevents spreading of the prongs independently of the bolt or bolts passed through said parts. This I accomplish by dovetailing the ribs or tongues on the prongs of the yoke and fitting the same into correspondingly-formed seats in the draft-bar. These dovetailed tongues and seats are tapered from one end to the other, and in combination therewith I provide a wedge bolt or rod, which tends to hold the said tapered tongues tightly driven into their respective seats.

My invention is illustrated in the accompanying drawings, wherein like characters indicate like parts throughout the several views.

Figure 1 is a view principally in plan, but partly in horizontal section, on the irregular line $x'$ $x'$ of Fig. 2. Fig. 2 is a side elevation of parts shown in Fig. 1, the coupler-head being broken away; and Fig. 3 is a vertical section on the line $x^3$ $x^3$ of Fig. 1.

The numeral 1 indicates the draft-bar of the coupler. The same, as shown, is provided at its outer end with a coupler 2 of the Master Car-Builders' type. At its inner end the said draft-bar is provided in its top and bottom surfaces with tapered dovetailed seats 3, which extend transversely thereof. Preferably the inner shoulder $3^a$ of each seat 3 extends transversely of the bar at a right angle thereto and has very much less bevel than has the other shoulder $3^b$.

The numeral 4 indicates the yoke or stirrup, the same being provided at the ends of its prongs with transversely-extending tapered and dovetailed ribs or tongues 5, which fit one in each of the said seats 3 in the draft-bar 1.

In the ordinary arrangement for connecting the yoke or stirrup to the draft-bar the said parts are provided with bolt holes or passages through which two bolts may be passed. In my present invention this arrangement is also made; but I go farther and provide a wedge-acting bolt 6, which is passed through perforations 7 in said yoke or stirrup and through a perforation 8 in the said draft-bar. These perforations 7 and 8, when the dovetailed ribs 5 are driven tightly into their seats 3, stand slightly out of alinement, as best shown in Fig. 3. The upper end of the said bolt 6 flares slightly, and in virtue of this construction the bolt under its weight will press against the shoulder $8^a$ of the perforation 8 and against the surfaces $7^a$ of the perforations 7, and will thereby constantly exercise a force tending to keep the tapered ribs or tongues 5 pressed tightly into their tapered seats 3. With this construction the prongs of the yoke or stirrup 4 will receive all of the draft strains and cannot spread or separate from the draft-bar. Bolts, if used, are not relied upon to perform either of the functions performed by the ribs or tongues 5 and their seats 3. If desired, however, an ordinary bolt may be passed through the coincident perforations 9 in the yoke 4 and draft-bar 1.

It will of course be understood that the invention above described is capable of some modifications as to details of construction and arrangement of parts.

The present device is an obvious improvement over the construction set forth in my two prior patents herein identified.

What I claim, and desire to secure by Letters Patent of the United States, is as follows:

1. A draft-bar and coöperating yoke or stirrup connected by dovetailed engagements which receive draft strains and prevent the prongs of said yoke from spreading, substantially as described.

2. The combination with a draft-bar having transversely-extended and tapered dovetailed seats, of a draft-yoke having transversely-extended and tapered dovetailed ribs fitting said dovetailed seats, and a bolt passed through said draft-bar and the prongs of said yoke for holding said parts together, substantially as described.

3. The combination with a draft-bar having transversely-extended and tapered dovetailed seats, a draft-yoke having transversely-extended and tapered dovetailed ribs fitting said seats, and a tapered bolt passed through perforations in said draft-bar and in the prongs of said yoke and tending to force said ribs tightly into said seats, substantially as described.

4. The combination with the draft-bar 1 having the tapered transversely-extended dovetailed seats 3 and vertical perforations 8 of the yoke 4 having the perforations 7 and provided with the tapered dovetailed ribs 5 which fit in said seats 3, and the tapered bolt 6 passed through said perforations 7 and 8 and tending to force said ribs 5 tightly into said seats 3, substantially as described.

In testimony whereof I affix my signature in presence of two witnesses.

ROBERT MORRIS.

Witnesses:
WM. S. BURROUGHS,
ANNA SPAULDING.